(12) United States Patent
Ellison et al.

(10) Patent No.: US 9,374,400 B2
(45) Date of Patent: *Jun. 21, 2016

(54) LOAD BALANCING IN A CENTRAL CONFERENCING ROUTING SERVER

(71) Applicant: Level 3 Communications, LLC, Broomfield, CO (US)

(72) Inventors: Gregory Thomas Ellison, Erie, CO (US); Andrew James Broadworth, Thornton, CO (US)

(73) Assignee: LEVEL 3 COMMUNICATIONS, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/887,165

(22) Filed: Oct. 19, 2015

(65) Prior Publication Data

US 2016/0050078 A1    Feb. 18, 2016

Related U.S. Application Data

(63) Continuation of application No. 13/708,678, filed on Dec. 7, 2012, now Pat. No. 9,167,011.

(60) Provisional application No. 61/578,794, filed on Dec. 21, 2011, provisional application No. 61/578,798, (Continued)

(51) Int. Cl.
*H04L 12/18* (2006.01)
*H04L 29/06* (2006.01)
*H04L 12/801* (2013.01)
*H04M 3/56* (2006.01)
(Continued)

(52) U.S. Cl.
CPC .............. *H04L 65/403* (2013.01); *H04L 12/18* (2013.01); *H04L 12/1818* (2013.01); *H04L 41/0668* (2013.01); *H04L 47/15* (2013.01); *H04L 61/2007* (2013.01); *H04L 65/1006* (2013.01); *H04L 65/1069* (2013.01); *H04L 67/18* (2013.01); *H04M 3/56* (2013.01)

(58) Field of Classification Search
None
See application file for complete search history.

(56) References Cited

U.S. PATENT DOCUMENTS 5,280,583 A    1/1994   Nakayama et al.
5,623,603 A    4/1997   Jiang et al.
(Continued)

FOREIGN PATENT DOCUMENTS

EP        2053869 A1    4/2009

OTHER PUBLICATIONS

U.S. Appl. No. 14/887,159, filed Oct. 19, 2015, Ellison, G., et al.
(Continued)

*Primary Examiner* — Thai Nguyen

(57) ABSTRACT

Aspects of the present disclosure involve systems, methods, computer program products, and the like, for collaboration conferencing with multiple participants over a communications network, and more specifically for a conferencing routing service for managing and routing collaboration participants. In one embodiment, the conferencing routing service may maintain a database of information or preferences associated with the conference requester and attempt to select a conference bridge based on the requester's information. Further, the conferencing routing service may receive performance information from a plurality of conference bridges that are able to conduct the collaboration conference and select a conference bridge in response to the performance information.

4 Claims, 10 Drawing Sheets

Related U.S. Application Data filed on Dec. 21, 2011, provisional application No. 61/578,803, filed on Dec. 21, 2011, provisional application No. 61/578,807, filed on Dec. 21, 2011, provisional application No. 61/578,810, filed on Dec. 21, 2011, provisional application No. 61/584,115, filed on Jan. 6, 2012, provisional application No. 61/584,122, filed on Jan. 6, 2012.

(51) Int. Cl.
*H04L 29/08* (2006.01)
*H04L 12/24* (2006.01)
*H04L 29/12* (2006.01)

(56) References Cited

U.S. PATENT DOCUMENTS

| | | | |
|---|---|---|---|
| 5,825,858 A * | 10/1998 | Shaffer | H04M 3/562 379/114.06 |
| 5,828,743 A | 10/1998 | Pinnell | |
| 6,411,605 B1 | 6/2002 | Vance et al. | |
| 6,553,413 B1 | 4/2003 | Leighton et al. | |
| 6,564,261 B1 | 5/2003 | Gudjonsson et al. | |
| 6,646,997 B1 | 11/2003 | Baxley et al. | |
| 6,657,975 B1 | 12/2003 | Baxley et al. | |
| 6,782,413 B1 | 8/2004 | Loveland | |
| 6,879,565 B2 | 4/2005 | Baxley et al. | |
| 6,885,740 B2 | 4/2005 | Ernstrom et al. | |
| 6,898,273 B2 | 5/2005 | Ernstrom et al. | |
| 6,961,416 B1 | 11/2005 | Summers et al. | |
| 7,054,933 B2 | 5/2006 | Baxley et al. | |
| 7,394,896 B2 | 7/2008 | Norton | |
| 7,460,493 B1 | 12/2008 | Dhanoa et al. | |
| 7,778,206 B2 | 8/2010 | Shaffer et al. | |
| 7,889,660 B2 | 2/2011 | Bugenhagen | |
| 8,060,563 B2 | 11/2011 | Whynot et al. | |
| 8,068,425 B2 | 11/2011 | Bugenhagen | |
| 8,189,468 B2 | 5/2012 | Bugenhagen | |
| 8,194,643 B2 | 6/2012 | Bugenhagen | |
| 8,229,096 B1 | 7/2012 | Marquis et al. | |
| 8,289,965 B2 | 10/2012 | Bugenhagen et al. | |
| 8,340,083 B2 | 12/2012 | Bugenhagen et al. | |
| 8,364,133 B1 | 1/2013 | Lucey et al. | |
| 8,428,634 B2 | 4/2013 | Schwagmann et al. | |
| 8,665,758 B1 | 3/2014 | Mateer | |
| 8,666,056 B2 | 3/2014 | Makagon et al. | |
| 8,737,596 B2 | 5/2014 | Kelley et al. | |
| 8,774,383 B1 | 7/2014 | Marquis et al. | |
| 8,798,251 B2 | 8/2014 | Rajagopalan et al. | |
| 2001/0002927 A1 | 6/2001 | Detampel, Jr. et al. | |
| 2002/0075304 A1 | 6/2002 | Thompson et al. | |
| 2002/0076025 A1 | 6/2002 | Liversidge et al. | |
| 2002/0172341 A1 | 11/2002 | Wellner et al. | |
| 2003/0023672 A1 | 1/2003 | Vaysman | |
| 2003/0156697 A1 | 8/2003 | Svercek | |
| 2003/0217174 A1 | 11/2003 | Dorenbosch et al. | |
| 2004/0047460 A1 | 3/2004 | Adams et al. | |
| 2004/0170266 A1 | 9/2004 | Adams et al. | |
| 2004/0246332 A1 | 12/2004 | Crouch | |
| 2005/0034079 A1 | 2/2005 | Gunasekar | |
| 2005/0058125 A1 | 3/2005 | Mutikainen et al. | |
| 2005/0213517 A1 | 9/2005 | Rodman et al. | |
| 2007/0217589 A1 | 9/2007 | Martin et al. | |
| 2007/0248022 A1 * | 10/2007 | Kumar | H04L 12/2602 370/252 |
| 2007/0266077 A1 | 11/2007 | Wengrovitz | |
| 2008/0031437 A1 | 2/2008 | Rey | |
| 2008/0049753 A1 | 2/2008 | Heinze et al. | |
| 2008/0063173 A1 | 3/2008 | Sarkar et al. | |
| 2008/0218586 A1 | 9/2008 | Graham et al. | |
| 2008/0253549 A1 | 10/2008 | Loveland | |
| 2009/0019367 A1 | 1/2009 | Cavagnari et al. | |
| 2010/0124321 A1 | 5/2010 | Alexandrov et al. | |
| 2010/0165889 A1 * | 7/2010 | Madabhushi | H04M 3/2227 370/261 |
| 2010/0169418 A1 | 7/2010 | Whynot et al. | |
| 2010/0275134 A1 | 10/2010 | Baker et al. | |
| 2013/0162756 A1 | 6/2013 | Ellison et al. | |
| 2013/0163409 A1 | 6/2013 | Ellison et al. | |
| 2013/0163435 A1 | 6/2013 | Ellison et al. | |
| 2013/0163481 A1 | 6/2013 | Ellison et al. | |
| 2013/0173706 A1 | 7/2013 | Broadworth et al. | |
| 2013/0335513 A1 | 12/2013 | Broadworth et al. | |
| 2013/0336170 A1 | 12/2013 | Broadworth et al. | |

OTHER PUBLICATIONS

U.S. Appl. No. 14/930,644, filed Nov. 2, 2015, Broadworth, A., et al.
U.S. Appl. No. 14/930,647, filed Nov. 2, 2015, Ellison, G., et al.
Extended European Search Report, dated May 18, 2015, Application No. 12860103.6, filed Dec. 20, 2012; 10 pgs.
Extended European Search Report, dated May 18, 2015, Application No. 13733754.9, filed Jan. 4, 2013; 10 pgs.
International Preliminary Report on Patentability, dated Jul. 8, 2014, Int'l Appl. No. PCT/US13/020244, Int'l Filing Date Jul. 8, 2014; 18 pgs.
International Preliminary Report on Patentability, dated Jun. 24, 2014, Int'l Appl. No. PCT/US12/071018, Int'l Filing Date Dec. 20, 2012; 8 pgs.
International Search Report, dated Apr. 23, 2013, Int'l Appl. No. PCT/US13/020244, Int'l Filing Date Jan. 4, 2013, 5 pgs.
International Search Report, dated Mar. 19, 2013, Int'l Appl. No. PCT/US12/071018, Int'l Filing Date Dec. 20, 2012; 3 pgs.
"Telecommunications and Internet Converged Services and Protocols for Advanced Networking (TISPAN)", Release 2;PSTN/ISDN simulation services: Conference (CONF); Protocol specification;13bTD300 WI03083 Discussion of 3PTY, ETSI Draft; European Telecommuniocations Standards Institute (ETSI), 650, Route des Lucioles; F-06921 Sophia-Antipolis; France; Mar. 20, 2007 , vol. zArchive, No. V0.0.3, pp. 1-20.
Written Opinion of the International Searching Authority, dated Apr. 23, 2013, Int'l Appl. No. PCT/US13/020244, Int'l Filing Date Jan. 4, 2013, 16 pgs.
Written Opinion of the International Searching Authority, dated Mar. 19, 2013, Int'l Appl. No. PCT/US12/071018, Int'l Filing Date Dec. 20, 2012, 5 pgs.
Colbert, Raymond O. et al., "Advanced Services: Changing How We Communicate", In: *Bell Labs Technical Journal* [online], [retrieved on Feb. 11, 2013] Retrieved from the Internet <URL: http://www.herbsleb.org/web-pubs/pdfs/colbert-advanced-2001.pdf>, entire document Jun. 2001 , pp. 211-228.

* cited by examiner

USUS 9,374,400 B2

LOAD BALANCING IN A CENTRAL CONFERENCING ROUTING SERVER

CROSS-REFERENCE TO RELATED APPLICATIONS

This application is a continuation of and claims the benefit of priority to U.S. Non-Provisional application Ser. No. 13/708,678 titled "LOAD BALANCING IN A CENTRAL CONFERENCING ROUTING SERVER," filed on Dec. 7, 2012, and is hereby incorporated by reference herein. Application Ser. No. 13/708,678 claims priority under 35 U.S.C. §119(e) to provisional patent application No. 61/584,115 titled "CENTRAL CONFERENCING ROUTING SERVICE" and provisional patent application No. 61/584,122 titled "CENTRAL CONFERENCING ROUTING SERVICE," both filed on Jan. 6, 2012 and both of which are hereby incorporated by reference herein. Application Ser. No. 13/708,678 claims priority under 35 U.S.C. §119(e) to U.S. Provisional Application No. 61/578,794 entitled "SIP-BASED VOIP COLLABORATION", U.S. Provisional Application No. 61/578,798 entitled "SIP-BASED VOIP COLLABORATION", U.S. Provisional Application No. 61/578,803 entitled "SIP-BASED VOIP COLLABORATION", U.S. Provisional Application No. 61/578,807 entitled "SIP-BASED VOIP COLLABORATION" and U.S. Provisional Application No. 61/578,810 entitled "SIP-BASED VOIP COLLABORATION" all filed on Dec. 21, 2011 and each of which is incorporated by reference in their entirety herein. In addition, this application is related to co-owned U.S. Non-Provisional patent application Ser. No. 13/708,636 titled "CENTRAL CONFERENCE ROUTING SERVER,", co-owned U.S. Non-Provisional patent application Ser. No. 13/708,659 titled "METHOD FOR ROUTING IN A CENTRAL CONFERENCE ROUTING SERVER," and co-owned U.S. Non-Provisional patent application Ser. No. 13/708,689 titled "DISASTER RECOVERY WITH A CENTRAL CONFERENCING ROUTING SERVER,", each of which are hereby incorporated by reference herein.

TECHNICAL FIELD

Aspects of the present disclosure generally relate to systems and methods that provide for collaboration conferencing with multiple participants using devices connected to a telecommunication network, including a VoIP network, and more specifically for a conferencing routing service for managing and routing collaboration participants.

BACKGROUND

Telecommunication networks provide for the transmission of information across some distance through terrestrial, wireless or satellite communication networks. Such communications may involve voice, data or multimedia information, among others. In addition, telecommunication networks often offer features and/or services to the customers of the network that provide flexible and varied ways in which the communications are transmitted over the network. For example, some telecommunication networks provide a conferencing feature that allows several users of the network to communicate at once, rather than a simple person-to-person communication. The number of participants to a conference communication may range from several users to several thousand users communicating on the same telephonic, video and/or data call.

Typically, conferencing communications require participants to the conference to place a telephonic call to a dedicated conferencing number. Some networks also require the participants enter a conference call code into the keypad of a telephonic device. The conferencing number and code are then utilized by the telecommunications network to connect that participant to a conference bridge device. In general, a conference bridge is a telecommunications device that hosts the participants of a conferencing communication such that the participants can participate in a conference call. Thus, the network typically receives the dialed number and conference code from each participant and connects the participant to the conference bridge. Once connected to the conference bridge, the participant may take part in the conference. To ensure that each of the participants of the conference may take part in the communication, each participant must connect to the same conference bridge. However, the routing of the participant to the conference bridge typically occurs without consideration of the routing of the other participants to the conference bridge by the network. Rather, each request from each participant may be routed to a dedicated conference bridge on an individual basis.

It is with these and other issues in mind, among others, that various aspects of the present disclosure were conceived and developed.

SUMMARY

One implementation of the present disclosure may take the form of a method for routing one or more collaboration conference access requests in a telecommunications network. The method may include the operations of receiving a collaboration conference access request from a requester's telephonic device, associating an identification number with the collaboration conference access request, the identification number associated with a customer of a telecommunications network and requesting operational information of at least one conference bridge of a plurality of conference bridges connected to a telecommunications network, the operational information comprising at least the available capacity for the at least one conference bridge. The method may also include the operations of selecting a hosting conference bridge from the plurality of conference bridges associated with the telecommunications network and configured to host a collaboration conference, the selection occurring at least in response to the operational information of the plurality of conference bridges and transmitting one or more routing messages to the telecommunications network, wherein the one or more routing messages include an indication of the selected conference bridge.

Another implementation of the present disclosure may take the form of a system for selecting a conference bridge associated with a network for hosting a collaboration conference event. The system comprises a network interface unit configured to receive a communication from a user of a communications network to establish a collaboration conference on the network, a processing device in communication with the network interface unit and a computer-readable medium connected to the processing device configured to store information and instructions. When executed by the processing device, the instructions perform the operations of associating an identification number with the collaboration conference communication from the user and transmitting one or more requests for performance information from one or more conference bridges of a plurality of conference bridges associated with the network, the operational information comprising at least the available capacity for the one or more conference bridges. The instructions also perform calculating a percentage of available capacity for the one or more conference bridges and selecting one of the one or more conference bridges associated with the network for hosting the conference event based at least on the calculated percentage of available capacity.

DETAILED DESCRIPTION

Aspects of the present disclosure involve systems, methods, computer program products, and the like, for collaboration conferencing with multiple participants over a communications network, and more specifically for a conferencing routing server for managing and routing collaboration participants. In one example, a central conferencing routing server (CCRS) may be implemented in the communications network to receive a request to join a collaboration conference from one or more of the participants and route the participants to a shared communication bridge that conducts the conference. Additionally, the CCRS may receive and maintain information about the communications network to intelligently route the collaboration conference to an appropriate bridge based on any number of criteria. For example, the CCRS may communicate with one or more conference bridges associated with the communications network and determine which conference bridge will host a collaboration conference request from a collaboration participant.

The CCRS may also determine which conference bridge will host a collaboration conference request based on other information. For example, the CCRS may maintain a database of information or preferences associated with the conference requester and attempt to select a conference bridge based on the requester's information. Such information may include, but is not limited to, a regional preference, the size of the collaboration request and certain collaboration features of the conference collaboration. In another example, the CCRS may receive performance information from a plurality of conference bridges that are able to conduct the collaboration conference and select a conference bridge in response to the performance information. For example, a particular bridge may provide certain additional features, such as high definition audio, and the selection of the conference bridge may be based on the desire for the additional feature or features. Also, the CCRS may be configured to respond to a failure in one of the conference bridges to allow for repair to the network and/or account for split conferences that may occur due to the bridge failure. In general, the CCRS may provide configurability in routing a collaboration conference to a conference bridge based on any number of criteria and information about the requester and the communications network on which the conference occurs.

Figure 1:
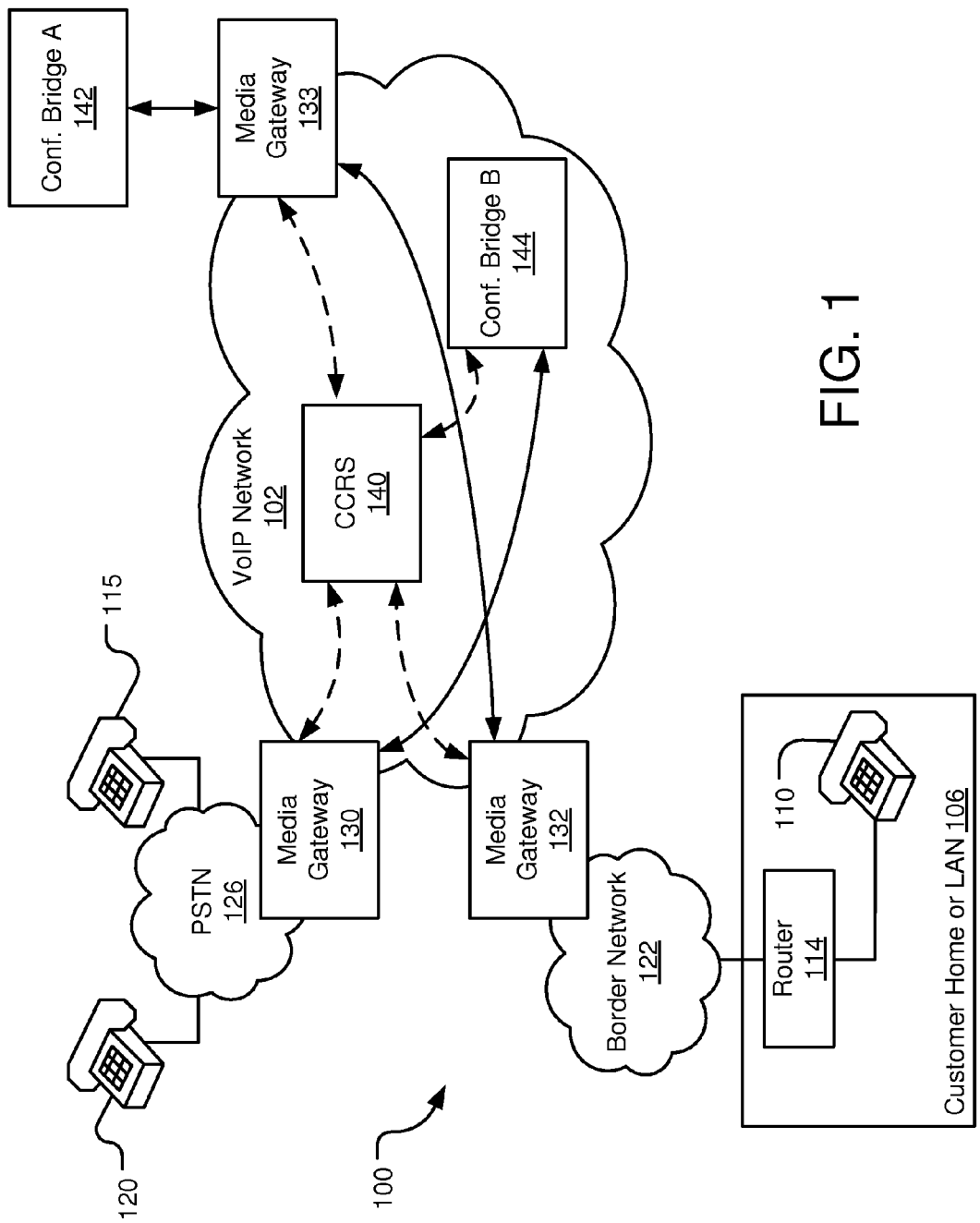
FIG. 1 schematic diagram illustrating an exemplary Voice over Internet Protocol (VoIP) operating environment, including a central conferencing routing server, in accordance with one embodiment.

FIG. 1 illustrates an exemplary operating environment 100 for hosting conference collaboration communications between multiple participants. The environment 100 provides for setting up communication sessions between network users. With specific reference to FIG. 1, the environment 100 includes a VoIP network 102, which may be provided by a wholesale network service provider. However, while the environment 100 of FIG. 1 shows a configuration using the VoIP network 102, it should be appreciated that any communication network is envisioned as included in the operating environment 100. For example, network 102 may be a circuit switch communication network utilizing time division multiplexing (TDM) or plain old telephone service (POTS) switching. In general, the network 102 of FIG. 1 may be any communication network known or hereafter developed. However, for ease of understanding, a VoIP network embodiment is hereafter used to describe the communications network.

The VoIP network 102 includes numerous components such as, but not limited to gateways, routers, and registrars, which enable communication across the VoIP network 102, but are not shown or described in detail here because those skilled in the art will readily understand these components. More relevant to this description is the interaction and communication between the VoIP network 102 and other entities, such as the one or more customer home or business local area networks (LANs) 106, where a participant in a conference will connect with the system for the conference.

Customer network 106 can include communication devices such as, but not limited to, a personal computer or a telephone 110 connected to a router/firewall 114. Although shown in FIG. 1 as telephonic devices 110, the communication devices may include any type of communication device that receives a multimedia signal, such as an audio, video or web-based signal, and presents that signal for use by a user of the communication device. The communication and networking components of the customer network 106 enable a user at the customer network 106 to communicate via the VoIP network 102 to other communication devices, such as another customer network and/or an analog telephone 115, 120. Components of the customer network 106 are typically home- or business-based, but they can be relocated and may be designed for easy portability. For example, the communication device 110 may be wireless (e.g., cellular) telephone or portable laptop computer.

The customer network 106 typically connects to the VoIP network 102 via a border network 122, such as one provided by an Internet Service Provider (ISP). The border network 122 is typically provided and maintained by a business or organization such as a local telephone company or cable company. The border network 122 may provide network/communication-related services to their customers. In contrast, the communication device 120 accesses, and is accessed by, the VoIP network 102 via a public switched telephone network (PSTN) 126 operated by a local exchange carrier (LEC). Communication via any of the networks can be wired, wireless, or any combination thereof. Additionally, the border network 122 and PSTN 126 may communicate, in some embodiments, with the VoIP Network 102 through a media gateway device (130, 132). For ease of instruction, only three communication devices 110, 115, 120 are shown communicating with the VoIP network 102; however, numerous such devices, and other devices, may be connected with the network, which is equipped to handle enormous numbers of simultaneous calls and other communications.

In general, a request for a collaboration conference over the VoIP network 102 is initiated by a requester through one of the communication devices 110, 115, 120 associated with the network. As used herein, the term "collaboration conference" includes any type of collaboration between three or more users of a communication network. For example, the collaboration conference may include audio collaboration, video collaboration, web collaboration, a combination of any of the above, and the like. For ease of instruction, the collaboration conferences discussed herein are generally made in reference to an audio conference, although any type of collaboration conference over a telecommunications network is envisioned with respect to the present disclosure. Similarly, although FIG. 1 illustrates the communication devices 110, 115, 120 as telephonic devices, the communication devices may be any type of communication device, including personal computers, cellular phones and the like.

Upon receipt of the request for a collaboration conference, the network 102 routes the request to the CCRS 140, integrated within the network 102. However, it should be appreciated that the CCRS 140 may be a part of the network 102, may be separate from the network, or may have portions deployed in the network and out of the network. In addition, the CCRS 140 may be resident on one or more components of the VoIP network 140, including several instances of the CCRS 140 integrated throughout the network 140. Further, although only a single instance of a CCRS 140 is illustrated in FIG. 1, any number of CCRS instances may be present in the network 102 to form a CCRS system. As discussed in more detail below, the network 102 may account for the availability of multiple CCRS devices or instances through a process of establishing a master CCRS control engine.

To transmit the request to the network, the requester uses the communication device 110, 115, 120 to dial a conference specific telephone number. In some instances, the network, upon receipt of the dialed communication, executes an application that queries the requester to enter an access code number that the requester enters into the communication device 110, 115, 120. With this information, the network 102 determines that the requester intends to initiate or join a collaboration conference and routes the request to a conference bridge, as explained in greater detail below.

In any event, the CCRS 140 receives the request to begin a collaboration conference or join an existing conference. In response, and described in more detail below, the CCRS 140 may route the one or more requests to one of several conference bridges 142, 144 associated with the VoIP network 102 for hosting of the collaboration conference. Although only two conference bridges 142, 144 are shown in FIG. 1, it should be appreciated that any number of conference bridges may be associated with the network 102 for hosting collaboration conferences.

In general, the conference bridges 142, 144 provide a hosting site for a collaboration conference between a plurality of users of the network 102. Thus, conference bridge A 142 may host a collaboration conference while conference bridge B 144 may host an additional collaboration conference. In particular, conference bridge A 142 is connected to the communications network 102 through a media gateway 133 similar to the media gateway disclosed above. This configuration may be utilized when the conference bridge 142 is a time division multiplex (TDM) bridge. Conference bridge B 144 is internal to the communications network 102 through which the communications of the conference are transmitted. This configuration is utilized for Internet Protocol (IP) based bridges.

Additionally, the CCRS 140 may be configured for use with any number of network and conference bridge platforms. For example, the telecommunications network 102 of FIG. 1 may be configured as a TDM network or an IP-based network, which includes video, audio and web-based components, to which the CCRS 140 may be configured to interface. Another particular network and/or conference bridge platform supported by the network configuration 102 of FIG. 1 is a Session Initiation Protocol (SIP) based network. For example, conference bridge B 144 may be a SIP-based conference bridge. Such IP-based components may provide additional conferencing features to the network by providing information concerning the collaboration conference in a header of a message transmitted through the network such as an identification of the collaboration conference, video integration, Uniform Resource Identifier (URI) based routing and conference integration, conference access credentials for authentication and permission to enter the requested conference. SIP-based conference bridges may also provide high definition audio, additional security features and transitions between collaboration conferences without having to redial into the system. In general, because components operating utilizing SIP can exchange information within a header, many additional features for a collaboration conference can be offered to participants on a SIP-based conference bridge. In addition, SIP-based CCRS devices may utilize many of the advantages of information exchange within the header when communicating with TDM-based network devices.

To connect to a collaboration conference, each participant to the conference may be routed to the same conference bridge 142, 144 for the duration of the conference. The conference bridge 142, 144, in turn, provides communication ports for each participant such that each participant can hear or otherwise participate in the collaboration conference. Any conference bridge known in the art or hereafter developed may be integrated into the system 100 of FIG. 1 for hosting a collaboration conference. In addition, the term "conference bridge" or "bridge" includes any component of a communication network that provides an access point to one or more users of the network for a collaboration conference. For example, "conference bridge" may also include such devices as a media server device, a gateway server device or the like as configured within the network 102.

Figure 2:
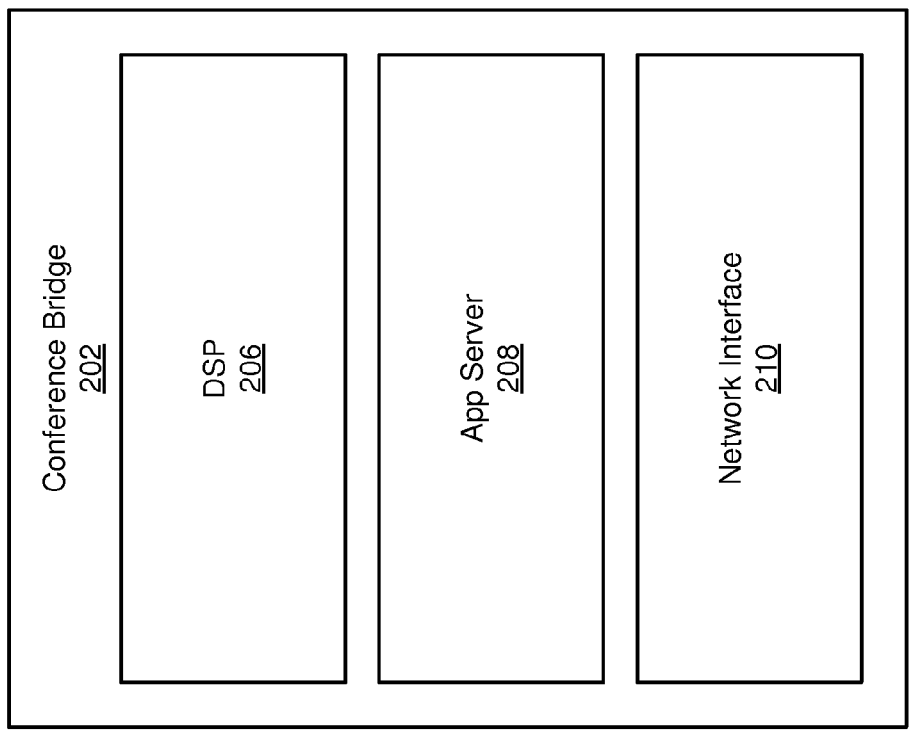
FIG. 2 is a block diagram illustrating a conference bridge configured to host one or more conferencing communications.

FIG. 2 is a block diagram illustrating an exemplary conference bridge device that may be utilized in the network configuration 100 of FIG. 1. The conference bridge 202 comprises an application server 208 and a digital signal processing (DSP) component 206. In general, the application server 208 of the conference bridge 204 communicates with one or more applications of the network to establish the collaboration conference. In addition, for SIP-based or other IP-based conference bridges, the bridge may include a network interface unit 210. In general, the application server 208 includes one or more applications that can be executed by the conference bridge 202 to perform many of the functions described herein for the conference bridge. In addition, the conference bridge 202 may include a network interface unit 210 for receiving information and/or instructions from the network 202 to route and connect a collaboration conference communication for that particular bridge. The network interface unit 210 connects to the media gateway 133 of FIG. 1 or connects directly to the core of the network 100 to receive the communications of the participants and connects each participant to each other to establish the collaboration conference. The network interface unit 210 may also initiate one or more of the applications stored in the application server for execution by the conference bridge. In general, the conference bridge 202 may receive a request from the network to connect a requester with a hosted conference. The request may be received through a signaling protocol, such as through a SIP-based communication. In response, the application server 208 may provision one or more ports for connection to the requester's communication. The app server 208 may then signal to the network 102 that the ports are available, at which point the data or audio portion of the communication may be routed to an available port in the conference bridge 202. In this manner, the handshaking between the network and the conference bridge 202 may occur over the signaling plane of the IP-based protocol separate from the data or audio portion of the communication request. A more detailed description of the method through which a request is routed to a conference bridge 202 is included below with reference to FIG. 3.

Figure 3:
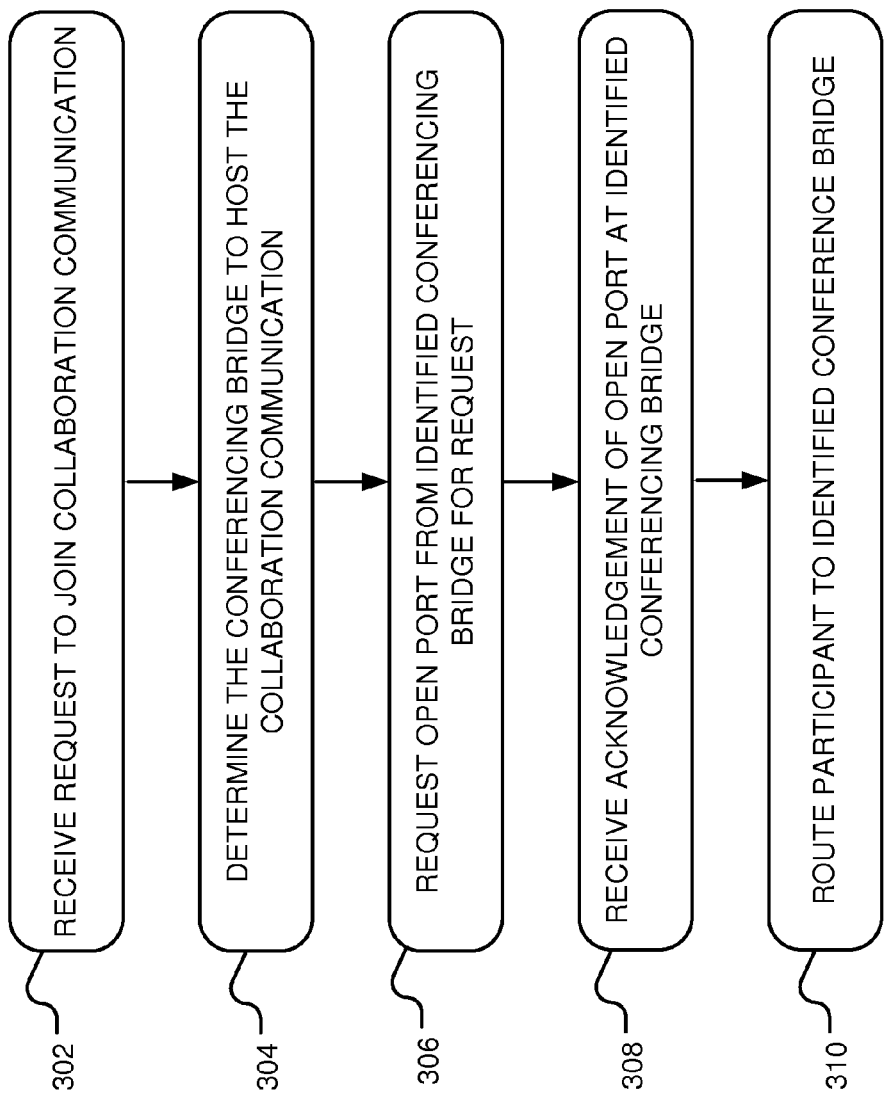
FIG. 3 is a flowchart of a method for the CCRS of the network 102 to receive a request from one or more participants to join a collaboration session and route the participants to the proper conference bridge

Returning to FIG. 1, the network 100 may be utilized by one or more participants to a collaboration or conferencing communication hosted on a conference bridge 142, 144. In particular, FIG. 3 is a flowchart of a method for the CCRS of the network 102 to receive a request from one or more participants to join a collaboration session and route the participants to the proper conference bridge 142, 144 through which the collaboration is hosted. In general, the operations described in relation to the flowchart of FIG. 3 are performed by one or more components of the CCRS 140 as part of the telecommunications network 102.

Beginning with operation 302, a participant to a conference communication may dial into the conference using a telephonic device 110, 115 and/or 120. In particular, the participant may dial a conference number and/or enter a conference code to access the collaboration conference. The media gateway 130, 132 or other switching device routes the request from the participant to the CCRS 140 through the network 102. In FIG. 1, the request is illustrated by the dashed line between the media gateway 130, 132 and the CCRS 140. As should be appreciated, in some IP networks, the request may be routed to the CCRS 140 on a signaling plane and does not include the audio portion of the communication. The request is then received by the CCRS 140, as indicated by operation 302 of FIG. 3.

Upon receipt, the CCRS 140 determines, in operation 304, which of the available conference bridges 142, 144 associated with the network 102 that is hosting or will host the collaboration conference requested by the participant. The CCRS 140 may utilize several factors to determine which conference bridge 142, 144 hosts the collaboration conference. Such factors and operations performed by the CCRS 140 to determine the appropriate conference bridge are discussed in more detail below. In addition, the CCRS 140 may communicate with one or more of the conference bridges 142, 144 associated with the network 102 in operation 304. This communication between the CCRS 140 and the conference bridges is illustrated by the dashed lines between the CCRS and the conference bridges in FIG. 1. Further, in the embodiment in which the conference bridge 142, 144 is within the network 100, the CCRS 140 would communicate directly with the conference bridge without going through the media gateway device 133.

In one embodiment, the CCRS 140 communicates particularly with the app server component 208 of the conference bridge 202 to determine the appropriate collaboration bridge and to establish the collaboration conference. The app server component 208 of the conference bridge 202 may provide any information concerning the conference bridge to the CCRS 140, including number and types of available ports, the technical capabilities of the conference bridge, current collaboration conferences being hosted by the conference bridge, and the like. In another example, the conference bridge 142 may be a SIP-based conference bridge. In this example, the CCRS 140 would communicate with the app server 208 through the network interface unit 210. The app server 208 then provisions the requested ports and notifies the CCRS 140 when such ports are available for the collaboration conference. In addition, the app server 208 provides the information of the conference bridge 142 that may be utilized by the CCRS 140 to determine which conference bridge will host the collaboration conference.

For example, a participant may utilize the telephonic device 120 or other communication device to access the network 100 and request access to a collaboration conference. The media gateway 130 associated with the communication device 120 routes the request to the CCRS 140. In response, the CCRS 140 identifies conference bridge B 144 as the conference bridge which will host or is hosting the collaboration conference. In one embodiment, the CCRS 140 communicates with conference bridge B 144 to determine availability and verify that the collaboration conference is hosted on conference bridge B.

In operation 306, the CCRS 140 requests an open communication port from the conference bridge 142 identified in operation 302. In the embodiment shown in FIG. 2, the conference bridge 202 may utilize a port in the DSP component 206 of the conference bridge in response to the request sent by the CCRS 140. The open port in the DSP component 206 allows the participant to connect to the collaboration conference hosted by the conference bridge 202 and participate in the conference. In addition, the conference bridge 202 may transmit an acknowledgement to the CCRS 140 from which the request originated to indicate that the requested communication is open. Again, in IP-based networks, the request for available ports and acknowledgement may occur on a separate communication signal than the audio or video portion of the collaboration communication. Further, a SIP-based network, the request may include certain information in the header of the request, such as the master ID number and/or the number of requested ports. The request made by the CCRS 140 to the conference bridge is illustrated in FIG. 1 as the dashed line from the CCRS to the media gateways associated with each conference bridge.

In operation 308, the CCRS 140 receives the acknowledgement message from the conference bridge 142. In one embodiment, the acknowledgement message contains information that identifies the open port to the CCRS 140. For example, in the SIP-based embodiment, the acknowledgment may include the IP address of the conference bridge in the header of the message. In response to receiving the acknowledgement message, the CCRS 140 routes the participant's communication to the open port in the conferencing bridge 142 in operation 310. In one embodiment, the CCRS 140 facilitates the communication to the conference bridge 142 such that the audio portion of the communication from the participant is no longer routed through the CCRS. For example, in a network 102 that utilizes Session Initiation Protocol (SIP), the CCRS 140 may issue a "SIP Refer" command to the media gateway 133 in operation 310 to route the participant communication to the conference bridge 142, effectively removing the CCRS from the communication flow. This refer message may include the IP address of the selected conference bridge in the header such that the network can route the communication to the selected conference bridge. The connection of the communication bypassing the CCRS is illustrated in FIG. 1 as the solid line connecting the media gateway 133 associated with the participant's telephonic device 120 and the media gateway associated with conference bridge A 142. Thus, through the use of the method outlined in FIG. 3, the CCRS 140 may receive a request from a participant of a collaboration conference and route the participant to the proper conference bridge that hosts the specific collaboration conference. In a similar manner, collaboration conference participants may be routed to media gateway 133 and conference bridge A 142 such that multiple conferences may be occurring simultaneously through the network 102 on multiple conferencing bridges 142, 144.

As can be understood in light of the CCRS described above, utilizing a central conferencing server provides several advantages over previous conferencing systems. As mentioned, prior art conferencing systems statically connected each participant to a conferencing bridge based on the number assigned to the participant. Thus, such networks had no mechanism for adjusting the load on any one conferencing bridge based on the number of conference participants. In addition, such systems proved difficult in determining proper billing rates for the collaboration conference as each participant could be requesting access to the conference from any place on the globe, without any central mechanism for determining the location of each participant.

In contrast, the CCRS of the present disclosure provides flexibility in the routing and handling of the collaboration conferences. For example, because each participant request is directed to the CCRS, handling of the participant request is easier on the communications network as the termination point for each request is the same component of the network. In particular, by including a component of the network that is dedicated to handling all requests for a conference participation, other components in the network that were previously tasked with receiving and routing the request may be freed to handle other type of network traffic. In addition, the CCRS provides protection against unintended overloading of a conference bridge. For example, a very large company with several thousand employees may utilize the communication network for collaboration conferences. However, because collaboration conference numbers are typically directly associated to a dedicated conference bridge for that number, too many employees of a particular company attempting to initiate a collaboration conference at the same time may overload a conference bridge that is already hosting several other collaboration conferences. To prevent this, many communication networks may assign several conferencing access numbers to the very large company so that the employees are spread over several conference bridges. However, providing several conferencing access numbers to a single entity may be confusing to the employees of the very large company. In contrast, because the CCRS provides dynamic routing of the conference participants, a single conference access number may be provided to the very large company as the same conference access number may be routed to any one of the available conferencing bridges, rather than the dedicated conference bridge for the number. In this example, even if an inordinate number of employees attempt to initiate collaboration conferences at the same time, the CCRS can route the participants accordingly such that all of the collaboration conferences do not end up on the same conference bridge that may overload the bridge.

In another example, an administrator of a collaboration conference may prefer to include other types of multimedia communications to accompany the voice portion of the collaboration conference. For example, a web page may be provided to an administrator of the conference to provide presentations and/or control over the conference. The web moderator web page provides such control features as the ability to mute all participants, disconnect a particular individual participant, show the number and identification of each participant, and the like. However, such a web page may not be within the capabilities of each conference bridge. Thus, when such features are requested by a moderator of the collaboration conference, it is often advantageous to place the conference on a conference bridge that supports such features. Such routing of a conference to a conference bridge that supports the technical requirements of the collaboration conference can occur dynamically through the use of the CCRS described above. Further examples of dynamic routing advantages gained through the use of a CCRS in the telecommunications network are described below.

Also, a conferencing system that utilizes a CCRS can adapt to varying aspects of the collaboration conference. For example, the CCRS may identify that the participants to a particular collaboration conference are originating from a certain region of the world, based on the telephonic device the requester accesses the network. In this example, the CCRS can route each participant to a conference bridge that is geographically located near the region of the world of each participant to improve the reliability of the conference. Also, the CCRS may aid in the accurate billing of the conference to a customer by providing a central location in which information for each participant to a conference can be retained and retrieved by the telecommunications network. Such information may not be available to a conference bridge that just receives communications from the telecommunications network as the information may be spread over any number of devices in the network.

An additional advantage provided by the CCRS is a more robust and faster disaster recovery during failure of a conference bridge hosting a collaboration conference. In previous conferencing systems, such disaster recovery required a network administrator to reroute each participant to the conference to a new conference bridge, requiring both time and manpower to accomplish. In contrast, the CCRS as described herein may be programmed to identify a failure at a conference bridge and dynamically reroute each participant to a new conference bridge. This rerouting of the participants to a new conference bridge may occur with or without action by a network administrator such that disaster recovery occurs automatically. These advantages and more may be realized through the utilization of a CCRS in a conferencing system provided by a telecommunications network.

Figure 4:
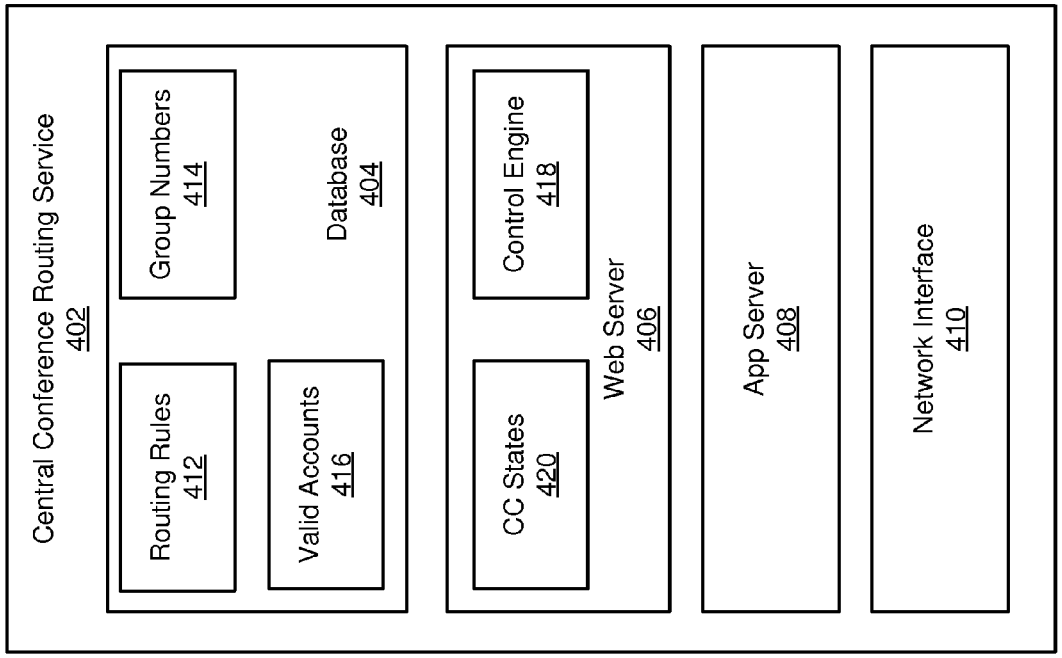
FIG. 4 is a block diagram illustrating several components of a central conferencing routing server.

FIG. 4 is a block diagram illustrating several components of a central conferencing routing server 140 that may be implemented on the network 100 of FIG. 1. The components outlined may be implemented by one or more processors executing one or more computer instructions stored in a computer-readable medium. Examples of systems that may execute or implement the components are provided below with reference to FIG. 5. Also, as mentioned above, the components of the CCRS may be located on any number of computing devices within the network, on any number of computing devices outside of the network, and/or a combination of both.

The CCRS 402 may include a database 404 configured to store information concerning an associated network, one or more customers or users of the network 416, identification numbers 414, and/or any other information useful by the CCRS in routing, billing, load balancing, disaster recover and the like for collaboration conferencing communications. For example, the database 404 may store identification numbers 414 for individuals or groups of users to the network who have access to a collaboration conference feature. Associated with the identification numbers may be one or more telephone numbers, access codes, communication device identifications, master identifications and routing rules associated with the users. The database 404 may also store information associated with the routing 412 and handling of collaboration conferencing, such as accepted communication devices, welcoming messages and operational rules for conducting the collaboration conference. In general, any information that may be utilized by the CCRS to route a collaboration communication and conduct the collaboration conference may be stored in one or more databases associated with the CCRS.

The CCRS also includes a web server 406 or web application that utilizes one or more applications stored in an application server 408 to execute the one or more applications. For example, the web server 406 may include one or more application programming interfaces (APIs) that execute any number of stored applications to perform the operations described herein. The web server 406 may also enable the provisioning of the databases 404 of the CCRS by the application server 408. In addition, the CCRS may include a network interface unit 410 as a proxy for receiving any type of information and/or instructions from the network 102 to route the communication. The network interface unit 410 may also initiate one or more of the applications stored in the application server or database for execution by the CCRS and/or receive a request from the telecommunications network to initiate a collaboration conference.

Through the use of the described components, the CCRS 402 provides added flexibility and features to collaboration conferencing not previously available. For example, because each collaboration conference request is routed through the CCRS or system of CCRS, routing rules may be applied to a block of related requesters identified by a master ID number or customer number, removing the need to update the routing rules for each member associated with the master ID or customer number. In addition, the database 404 of the CCRS 402 may maintain a control engine or state of a particular CCRS that determines which conference bridge a collaboration conference occurs. Thus, through the centralized nature of the CCRS 402 and the storage of customer and conference information, the CCRS provides flexibility in routing the collaboration conference requests.

Figure 3B:
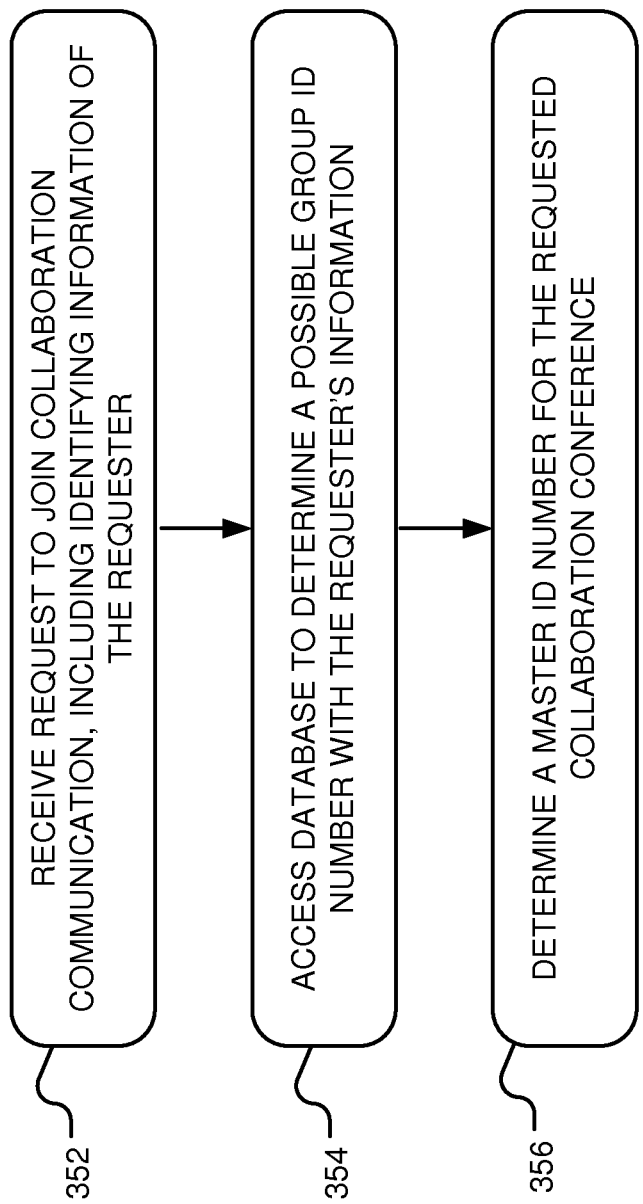
FIG. 3B is a flowchart illustrating a method for a central conferencing routing server to receive a request for a collaboration conference and associating a master identification number to the collaboration conference.

In operation, the CCRS 402 may perform the operations of the flowchart of FIG. 3B. In particular, the CCRS 402 receives a request to establish a collaboration conference at the network interface 410 in operation 352. The request may include information concerning the requestor, such as requestor's telephone number and access code number. However, although the operations of FIG. 3B are described in reference to the request comprising the requestor's telephone phone number and access code number, this is but one example of the information used by the CCRS to identify the requester. For example, the request may include an identification of the requester's communication device, such as a text string of the requester's personal computer. In another example, the requester's name may be used as the identifier of the requester in the request. Thus, any operation described herein utilizing the requester's telephone number and access code may be applied to other information contained in the request. For ease of instruction, however, the example of the telephone number and access code number is used.

Upon receiving the request, the application server 408, in concert with the web server 406, utilizes the requestor's telephone number and access code number to possibly determine a group ID number for the requester in operation 354. In particular, with the requester's information, the application server 408 accesses a lookup table stored in the database 404 to match the telephone number and code access number to the group ID number. In some instances, it is advantageous to associate a group ID number to a group of users of the collaboration conference system. For example, through the group ID, one or more routing rules may be applied to the entire group without the need to provide a routing rule for each individual member of the group. In some instances, the group ID number may be associated with a customer ID number such that each member associated with a customer ID number is given the same group ID number and alterations to the customer's account with the network can be applied to each group member through alterations to routing rules associated with the group ID number. Other information concerning the requester, the network and/or the collaboration conference may also be retrieved by the application server 408.

In operation 356, the application server 356 may also associate a master ID reference or number to the collaboration conference request and stores the master ID reference or number in the database 404. The master ID reference or number is utilized by the network to track the collaboration conference and the participants to the conference and may be associated with the requester's information. With the master ID number associated with the request, the application server 408 again accesses the database 404 to determine a state of the collaboration conference. In general, if the collaboration conference has been established on a conference bridge (such that the requester is a participant to the collaboration conference and not the initiator), the database 404 includes an identification of the conference bridge on which the collaboration conferencing is hosted. Alternatively, if the request is to initiate a new collaboration conference, the database includes a notification the request is a request for a new collaboration conference, at which point the application server routes the request to a master CCRS device that executes a master control engine application to determine which conference bridge will host the conference. In this manner, the components of the CCRS 402 receive the request to join or initiate a collaboration conference and route the request to the proper conference bridge.

As mentioned above, the database 402 may include a subscriber information table 414 that associates information of the requester (such as a telephone number, access code number or other identification or reference of a requestor) to a group ID number for the CCRS system. Thus, several different requester references can be associated with the same group ID number, such as a customer number. In addition, one or more routing rules 412 can be associated with a group ID number in the database 402. For example, one routing rule 412 may restrict all collaboration conferences for a particular group ID number to a particular conference bridge. This removes the need to manually change the routing rules for each individual requester for all of the members of a particular group ID number. Further, the database 404 of the CCRS 402 may be utilized by a control engine 418 of the CCRS system to store information 416 utilized by the control engine, such as associating a master ID number of a collaboration conference with an ID of the conference bridge on which the conference is hosted, the status of a collaboration conference 420, the start time of the collaboration conference, the participant count of the conference, the maximum number of participants that have attended the particular conference, and the like. In general, the database 404 may include any information concerning collaboration conferences hosted by the telecommunications network.

Figure 5:
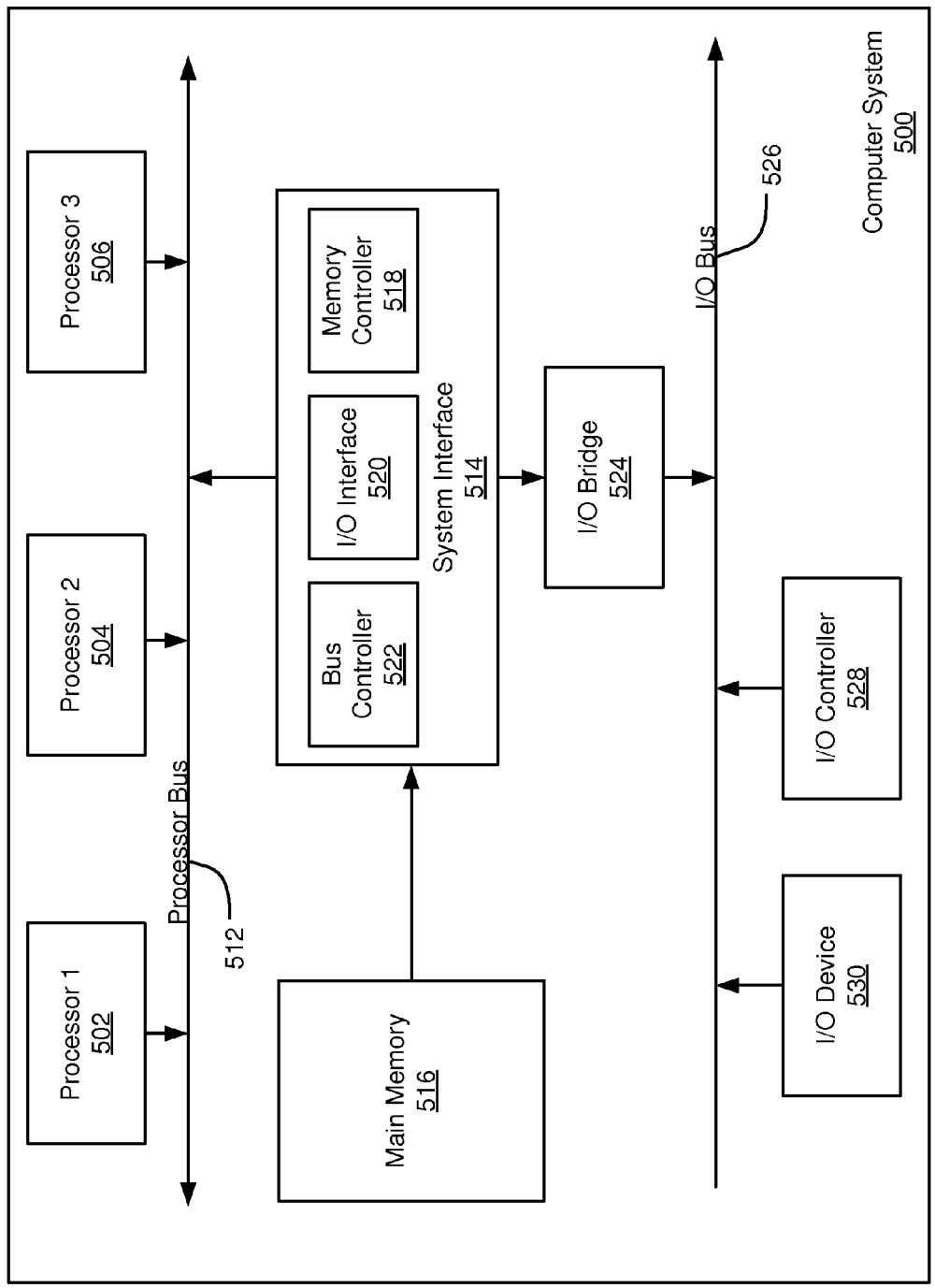
FIG. 5 is a diagram illustrating an example of a computing system which may be used in implementing embodiments of the present disclosure.

FIG. 5 is a block diagram illustrating an example of a computing device or computer system 500 which may be used in implementing embodiments of the present invention. The computer system (system) includes one or more processors 502-506. Processors 502-506 may include one or more internal levels of cache (not shown) and a bus controller or bus interface unit to direct interaction with the processor bus 512. Processor bus 512, also known as the host bus or the front side bus, may be used to couple the processors 502-506 with the system interface 514. Processors 502-506 may also be purpose built for processing/mixing media data, such as audio or video components of a media stream, such as a digital switch processor. System interface 514 may be connected to the processor bus 512 to interface other components of the system 500 with the processor bus 512. For example, system interface 514 may include a memory controller 515 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. One or more I/O controllers and/or I/O devices may be connected with the I/O bus 526, such as I/O controller 528 and I/O device 550, as illustrated.

I/O device 550 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system set forth in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions. Thus, embodiments of the present disclosure may include both hardware and software components.

A machine readable medium includes any mechanism for storing information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 516. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

By utilizing one or more of the embodiments described above, the CCRS system may route a collaboration conference communication to an appropriate conference bridge based on any number of preferences or information about the requester and/or communication network. In one example, the CCRS may employ one or more control engines that monitor or maintain a status of the collaboration conferences occurring over the network. The control engines maintain information about each collaboration conference, such as a master identification number for the conference, a status (such as active, inactive, temporary, or unknown), the conference bridge on which the conference is hosted, a start time for the conference, a participant count, a maximum participant count and a stop time for the conference, among other information in a database associated with the CCRS system. In general, the control engines may obtain or receive any information about the conference and maintain a record of the information for use by the CCRS system. As such, each control engine in the CCRS may be connected to or otherwise associated with the conference bridges associated with the communications network to provide and receive information concerning the collaboration conferences of the network. In one embodiment, the control engines may be an application executed by the application server 408 with the information or data stored in the database 404. The operation of the control engine in relation to the CCRS is described in more detail in U.S. Non-Provisional patent application Ser. No. 13/708,659 titled "METHOD FOR ROUTING IN A CENTRAL CONFERENCING ROUTING SERVER," which is hereby incorporated by reference herein.

The CCRS may utilize the information maintained in the database or databases of the CCRS system to perform several of the functions related to the routing of conference communications described above. For example, a request received by the CCRS to join an existing collaboration conference may be routed to the correct conference bridge by referring to the information stored by the control engines in the database. As mentioned above, the control engines maintain a status of each conference and the conference bridge on which the conference occurs. With this information, the CCRS may appropriately route any additional participants to the correct conference bridge. Such information may also aid in routing requests for a new collaboration conference to a suitable conference bridge, including based on network performance and user preferences. One example of such a CCRS system utilizing performance and preference information to route one or more requests to initiate a collaboration conference is described in more detail below.

Figure 6:
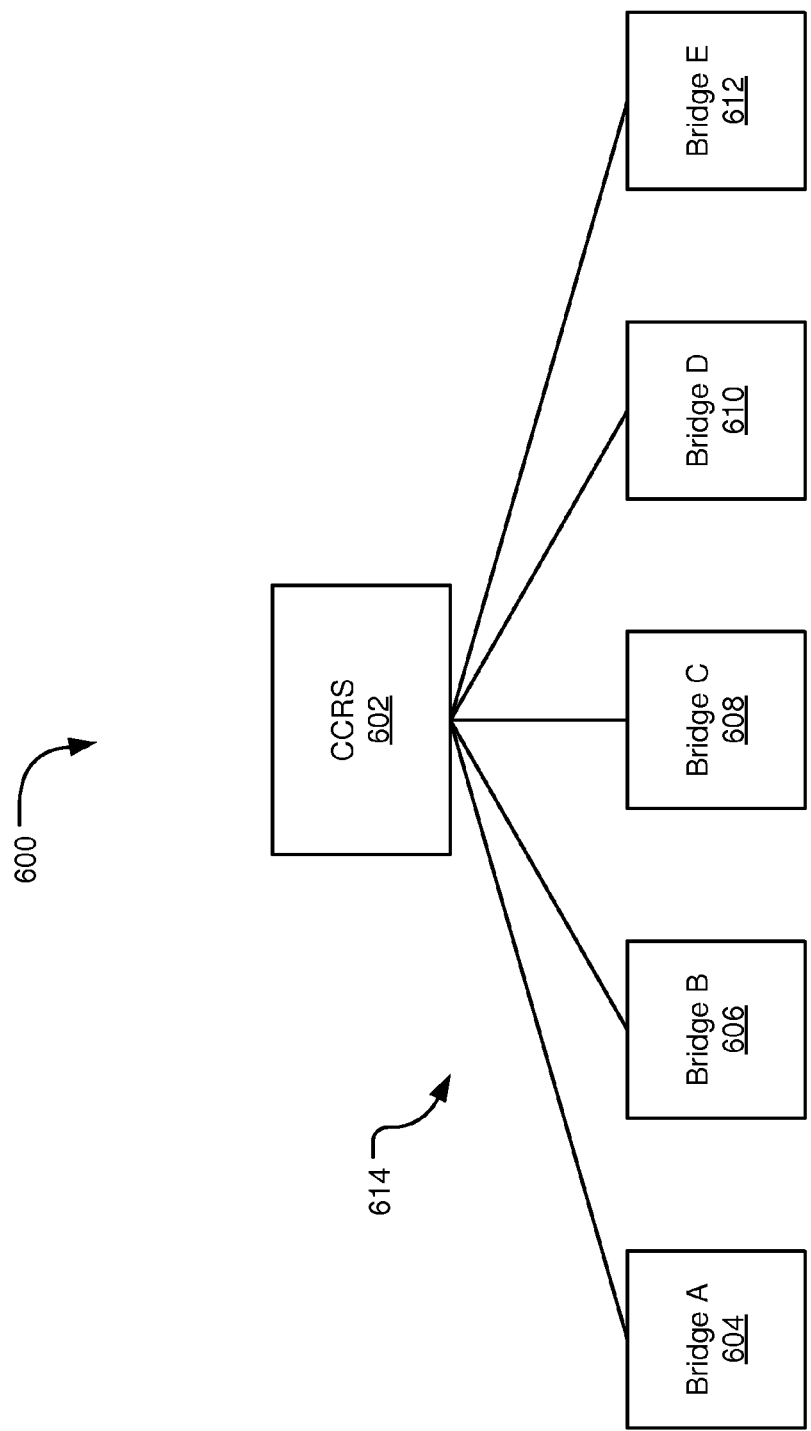
FIG. 6 is a block diagram of a central conferencing routing server connected to a plurality of conference bridges over a telecommunications network.

FIG. 6 is a block diagram of a central conferencing routing server connected to a plurality of conference bridges over a telecommunications network. Although illustrated in FIG. 6 as a single CCRS 602, it should be appreciated that the CCRS system 600 may include any number of CCRS servers or devices. In such a configuration, one CCRS 602 of the system 600 may be designated as the master CCRS or execute the master control engine application. In general, the master control engine application is tasked with determining which conference bridge of the available conference bridges of the system hosts a collaboration conference request. Thus, the CCRS 602 shown in FIG. 6 illustrates the master CCRS or CCRS device that executes the master control engine application. However, it is not necessary that the master control engine, or that any form of master control be involved with the system. Further, the CCRS 602 may take many forms. For example, the CCRS may be a plurality of application servers embodied on any number of telecommunication devices. In another example, the various components that comprise the CCRS 602 in the network may be embodied on various such network components.

In addition, the CCRS 602 may be connected to any number of conference bridges 604-612. The conference bridges 604-612 are similar to the conference bridges described above with relation to FIGS. 1 and 2 such that the connections 614 between the CCRS 602 and the conference bridges 604-612 may occur over one or more telecommunications networks. In general, the conference bridges 604-612 host collaboration conferences. Although five such conference bridges are shown in FIG. 6, it is contemplated that any number of conference bridges 604-612 may be connected to or otherwise associated the CCRS 602. Also, although the system 600 of FIG. 6 is configured such that the CCRS 602 is connected to each available conference bridge 604-612 through CCRS-bridge communication lines 614, the system may be configured differently such that the CCRS is connected to any number of available conference bridges. As should be appreciated, the CCRS-bridge communication lines 614 may occur over any number of telecommunications networks as described in relation to FIG. 1 above.

In previous collaboration conference systems of telecommunications networks, the load experienced by any one conference bridge is typically not analyzed by the network prior to routing of a collaboration conference request to a conference bridge. Rather, many such conventional systems used simple methods to attempt to spread the collaboration conferences across the available conference bridge. For example, one such method included dividing a received access code from the requester by a specific number and assigning the request to a conference bridge based on the remainder value from the division. Thus, although this method attempted to balance the collaboration conferences across the conference bridges, the systems generally did not account for the number of participants to the collaboration conferences or the general load experienced by the conference bridges at any one time. In addition, the method failed to account for the potential for additional collaboration conferences and the load those additional conferences may place on the conference bridges. Rather, such load balancing was typically accomplished through a manual manipulation of the requests from a human administrator of the network.

Figure 7:
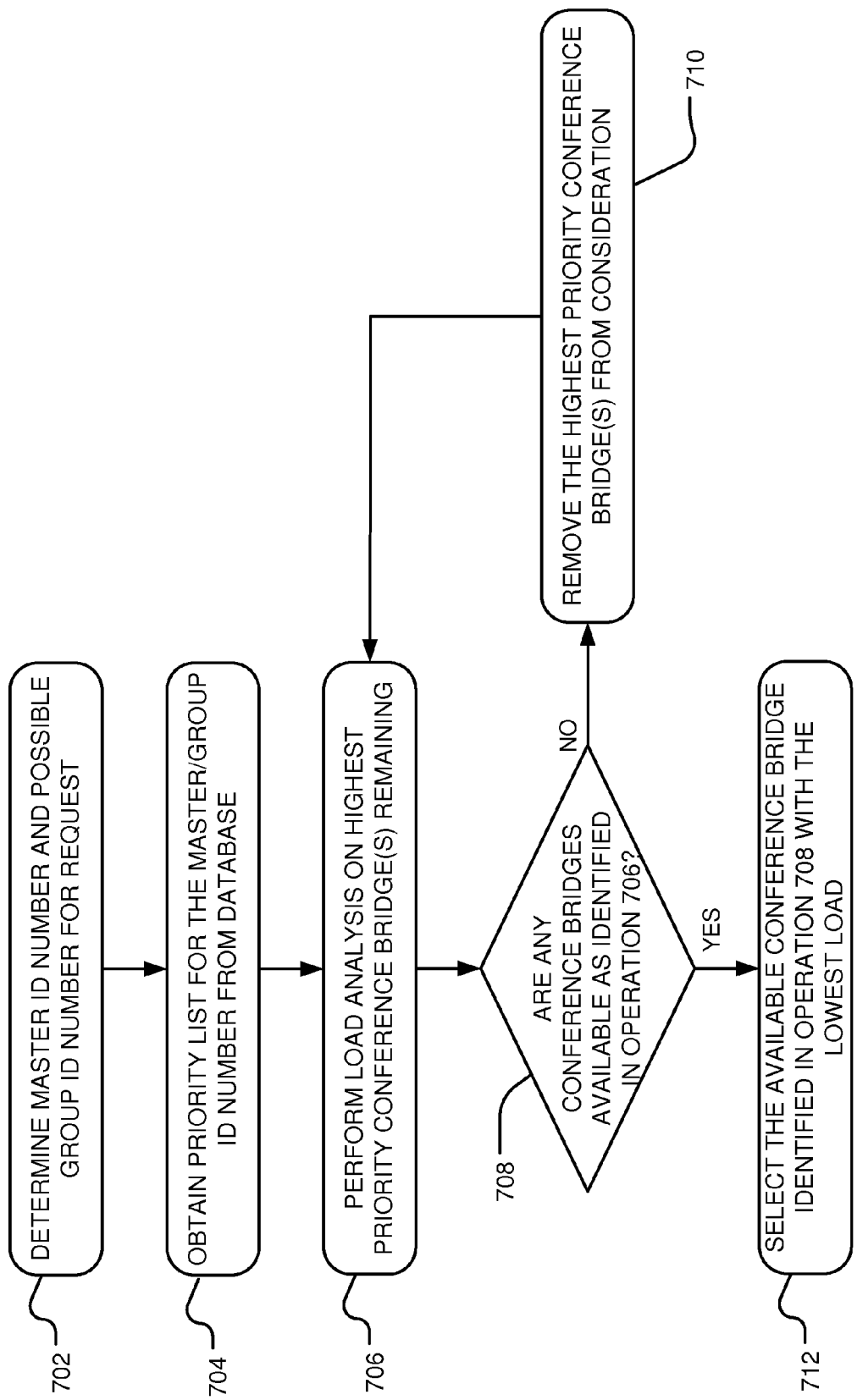
FIG. 7 is a flowchart of a method for utilizing a routing rule and a priority list to select a conference bridge from a plurality of available conference bridges.

Through the use of the CCRS system 600 illustrated in FIGS. 1-6, however, a load balancing or intelligent routing of collaboration conference requests can be accomplished. In particular, referring to FIG. 3, the CCRS system receives a request to join a collaboration conference in operation 302, and determines the conference bridge that will host the collaboration conference in operation 304. The flowchart of FIG. 7 is one embodiment of a method to receive such a request and determine the hosting conference bridge based on performance parameters of the conference bridges. In one specific example implementation, the operations of the flowchart of FIG. 7 may be performed a CCRS executing the master control engine application by collecting performance information from the conference bridges and selecting a conference bridge for hosting the collaboration conference based, at least in part, on the performance information.

Beginning in operation 702, the CCRS determines a master identification (or "master ID") for the collaboration conference request. In particular, the request received by the CCRS 602 from the requester may include any information to identify the requester, including a telephone number and an access code number. With this information contained in the request, the CCRS 602 accesses a database of customer related information and determines a master ID number that is associated with the request. In one embodiment, the master ID number is related to a group ID number of the requester. In general, the master ID number aids the CCRS in identifying the collaboration conference and tracking the progress of the collaboration conference within the network. Further, as explained in more detail below, the group ID number, if one is associated with the requester, may be used as a reference to determine one or more priority tables or routing rules to apply to the collaboration conference request.

Figure 8:
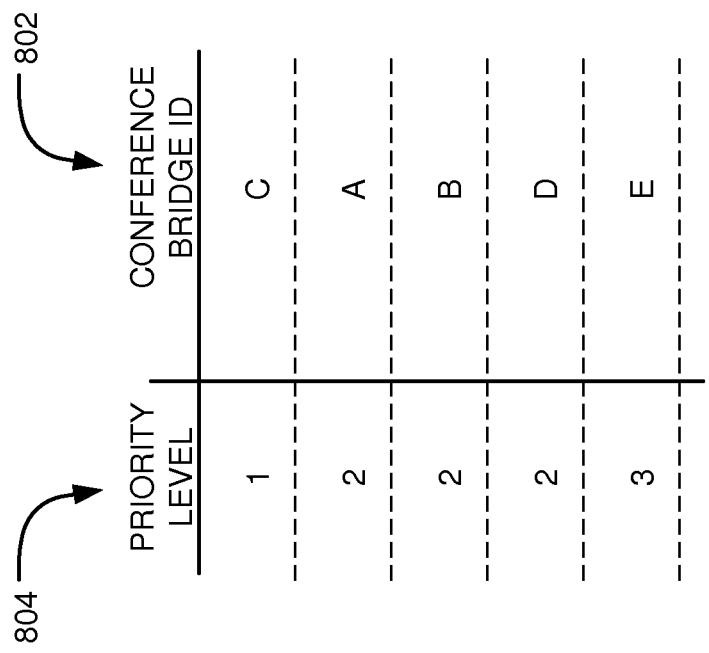
FIG. 8 is a diagram illustrating a priority table of a plurality of available conference bridges for a routing rule of a customer to a telecommunications network.

After the master ID (and possibly related number group) is determined in operation 702, the CCRS 602 obtains a priority list or table associated with that master ID or number group from the database. In general, the priority table includes a list of one or more of the conference bridges 604-612 of the network prioritized in order of preference for the particular master ID or group ID number. FIG. 8 is a diagram illustrating an example of a priority table including a list of a plurality of available conference bridges for a requester to a collaboration conference based on the identifier of the requester. The entries in the priority table of FIG. 8 correspond to the system 600 shown in FIG. 6. The priority table comprises a column of one or more of the available conference bridges 802 and a column of the priority 804 of each conference bridge for that particular master or group ID number. In the embodiment shown in FIG. 8, the conference bridges 802 are listed in descending order based on the priority. Thus, conference bridge C (corresponding to conference bridge 608 of FIG. 6) has a priority level of "1" in the table, conference bridge A, conference bridge B and conference bridge D (corresponding to conference bridges 604, 606 and 610 respectively) have a priority level of "2" in the table and conference bridge E (corresponding to conference bridge 612) has a priority level of "3" in the table.

It should be appreciated that the embodiment of the priority table of FIG. 8 is but one example of a possible priority table for a master or group ID collaboration conference number. For example, although the priority table in FIG. 8 includes a priority for every conference bridge 604-612 in the system 600, it is not required that each conference bridge be given a priority for a particular ID number. In one particular example, the priority list may include a single conference bridge for routing of collaboration conferences for that master or group ID number. Also, the priority table may include any number of priority levels. Further, any number of conference bridges may have the same priority in the priority table. Thus, similar to the priority level "2" in the table of FIG. 8, a plurality of conference bridges may have the same priority level in the priority table. For example, the priority table may include the five available conference bridges, each with a priority level of "1". Also, the priority table may be organized in any manner that is useful for retrieval from the database by the CCRS. For example, the conference bridges may be sorted in ascending order of priority level, descending order, or any other order that aids the master control engine in selecting a hosting conference bridge from the priority table.

The prioritization of the conference bridges in the priority table may be for any number of performance reasons. In one embodiment, the priority given to any conference bridge is based on the geographic location of the conference bridge. For example, a customer to the telecommunications network may request that all collaboration conferences transmitted from that customer occur on a conference bridge local to the customer. Thus, a European customer may request a high priority given to a European-based conference bridge. In another embodiment, the priority may be based on the technical features of a conference bridge. For example, a particular customer to the telecommunications network may request access to conference bridges that provide both video and audio collaboration capabilities. Such technical features may be provided by a SIP or other IP-based conference bridges. Therefore, in this example, the conference bridges in the network that provide such services may be given a higher priority than those bridges that do not provide such technical features. In another embodiment, the priority may be based on the size of the customer. More particularly, a customer with a large member size may have a conference bridge dedicated to the members of that customer such that the dedicated conference bridge is given a high priority in the priority table for members of that customer. In yet another embodiment, the priority may be based on any combination of the above factors, including geographic location and technical capabilities of the conference bridges in the network.

In the example shown in FIG. 8 and FIG. 6, the priority table includes three priority levels for the five conference bridges 604-612. The highest priority (priority "1") is given to conference bridge C 608, perhaps because conference bridge C is geographically located nearest the requester or because conference bridge C provides technical features not available from the other conference bridges. A second priority (priority "2") is given to conference bridge A 604, conference bridge B 606 and conference bridge D 608. In the priority table of FIG. 8, the conference bridges with the same priority level are sorted based on an identification number of the conference bridge such that conference bridge A is listed before conference bridge B, and so on. However, similar to conference bridges of different priority levels, the sorting of conference bridges with the same priority level may take any form. A third priority (priority "3") is given to conference bridge E 612, perhaps because conference bridge E is geographically the furthest from the requester or for some other reason related to the conference bridge and the requester of the collaboration conference.

Returning to the method of FIG. 7, once the priority table for the requester is obtained, the CCRS 602 performs a load analysis for the conference bridges with the highest priority in the priority list in operation 706. In one embodiment, the load analysis is performed only for the conference bridges with the highest priority. In another embodiment, the load analysis for each conference bridge connected to the CCRS is performed. In yet another embodiment, the load analysis is performed at regular intervals, regardless of the priority tables stored in the database. In this embodiment, the CCRS may store the results of the load analysis in a database for use by the CCRS at any time. Thus, rather than performing the load analysis at the time a conference is requested, the CCRS may instead retrieve the latest load analysis information stored in the database for one of more of the conference bridges.

Figure 9:
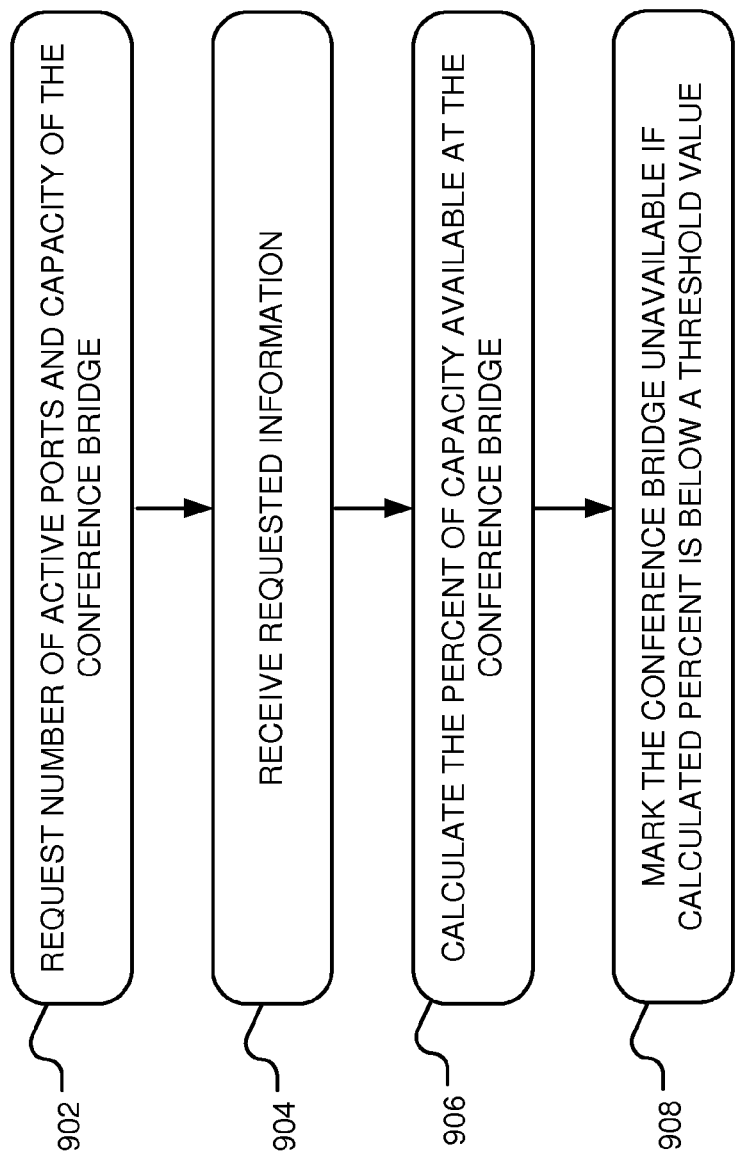
FIG. 9 is a flowchart of a method for performing load analysis of one or more conference bridges of a telecommunication network.

To perform the load analysis, the CCRS may perform the operations illustrated in the flowchart of FIG. 9. Beginning in operation 902, the CCRS requests certain performance information from one or more of the conference bridges. In particular, the CCRS requests the capacity of the conference bridge, such as the total number of communication ports for the bridge, and the number of currently active or reserved ports. This information is received by the CCRS in operation 904. It should be recognized that some or all of the information may be stored and retrieved from storage, as opposed to querying the bridges themselves. Additionally, the conference bridges may be configured to auto-report the performance information to the CCRS such that operation 902 may be omitted from the method. Regardless, performance information is obtained by the CCRS for at least one of the conference bridges of the network.

In operation 906, the CCRS calculates a percentage of available communication ports of the conference bridge or bridges. For example, a conference bridge may transmit the capacity of the conference bridge as 900,000 ports, of which 300,000 ports are active or reserved. Thus, in this example, 33% of the ports of the conference bridge are active or reserved such that 67% of the ports of the conference bridge are available for further collaboration conferences. In this manner, based on the performance information received from the conference bridges, the CCRS calculates the percentage of communication ports that are available at the conference bridge. In some embodiments, this information can be stored in a related database for use by the CCRS, such as during load balancing outlined in FIG. 7.

In operation 908, the CCRS identifies those conference bridges that have a percentage of available communication ports that drops below a threshold value. For example, the CCRS system may be configured to identify any conference bridge that has an available capacity percentage below 10%, indicating that 90% of the communication ports of the conference bridge are in use. In general, the threshold value may be any percentage value as set by an administrator of the CCRS system, as computed by the system such as through historical use trends or otherwise. This analysis may further consider the size of a potential collaboration conference, such that a conference with several participants may be included in the analysis of available capacity to determine if the conference bridge can host the conference. Once identified as having insufficient available ports, the CCRS may mark the conference bridge as unavailable for hosting a collaboration conference, until the capacity percentage returns to within an acceptable range. Thus, the CCRS may continue to analyze or monitor unavailable conference bridges to determine when the conference bridge returns to acceptable capacity. Such analysis may be calculated in conjunction with a conference requested or independently. In addition, each CCRS device in the CCRS system may have its own threshold value such that the threshold value for one CCRS device is not necessarily the same as the threshold value of another CCRS device in the system.

Returning to operation 706 of FIG. 7, the CCRS conducts the load analysis outlined above for at least the conference bridges with the highest priority. Utilizing the example priority table of FIG. 8, the CCRS performs a load analysis on conference bridge C 608, as it is listed in the priority table for that master ID as having the highest priority. Further, assume for the sake of this example, that the load analysis indicates that conference bridge C 608 is not available. In other words, the percent available capacity of conference bridge C 608 is below the threshold value for the CCRS system. Thus, in operation 708, the CCRS determines if any of the conference bridges identified in operation 706 are available. In the example used, conference bridge C 608 is identified, but the load analysis indicates that the bridge is unavailable. Thus, the CCRS would proceed to perform operation 710.

In operation 710, the CCRS removes from consideration those bridges with the highest priority. In other words, if the CCRS determines that no conference bridge with the highest priority is available to host the collaboration conference request, the CCRS moves to the next lower priority level and again determines the load availability of the conference bridge or conference bridges for the next priority level in operation 706. Continuing the above example, as conference bridge C 608 was deemed as unavailable due to the load condition of the bridge, the CCRS moves to the next lower priority level (in this case priority level "2") and performs the load analysis on conference bridge A 604, conference bridge B 606 and conference bridge D 610, as these conference bridges all have the priority level of "2". Further, after performing the load analysis on these conference bridges, the CCRS determines if any conference bridge of the identified bridges is available in operation 708. In some embodiments, the load analysis may be performed for every bridge in the system or on a subset of bridges such that the lack of an available bridge within a priority level results in the CCRS attempting to connect to a bridge at a lower priority level without performing a new load analysis.

If it is determined in operation 708 that a conference bridge is available based on the load calculation for the bridge or bridges, the CCRS selects a conference bridge to host the collaboration conference in operation 712. In some instances, the CCRS may select between several available conference bridges, such as when several conference bridges have the same priority level and are available based on the load analysis. In one embodiment of the method of FIG. 7, the CCRS in this circumstance selects the conference bridge with the most available capacity of those conference bridges analyzed in operations 706 and 708. In another embodiment, the CCRS selects the next available conference bridge based on the conference bridge ID. In any event, the CCRS selects a conference bridge from the available conference bridges in operation 712. In rare circumstances, each conference bridge in the customer's priority table may be full or unavailable. In this instance, the request for a collaboration conference may be denied and a recorded message may be provided to the requester indicating that all of the circuits are currently active.

With the selection of the conference bridge in operation 712, the CCRS can return to the method of FIG. 3 and connect the requester to a conference bridge for the collaboration conference. Thus, through the operations of FIGS. 7 and 9, the CCRS can intelligently route collaboration conferencing requests to a conference bridge based on a preference by the requester (through the priority table) and on the available capacity for the preferred conference bridge or bridges. In this manner, collaboration conferences through the telecommunications network that utilize the CCRS system can be balanced to avoid over-loading of a conference bridge, as well as provide flexibility of the network in providing the type of collaboration conference desired by the customers to the network.

In another embodiment of the CCRS system, the CCRS is configured to provide a throttling feature when selecting a conference bridge for hosting a collaboration conference. In some circumstances, a conference bridge is powered down or otherwise temporarily removed from the telecommunications network. For example, a conference bridge that has failed may require a reboot to restart the conference bridge. In another example, a new conference bridge may be added to the telecommunications network. In these circumstances, the CCRS system may be configured to add collaboration conferences to the newly added or restarted conference bridge slowly so as to not overload the conference bridge quickly. When such throttling applies, the CCRS system limits the number of ports requested of the conference bridge for particular time frames, slowly increasing the number of active ports until the conference bridge is near the level of the other conference bridges in the system. In one embodiment, a conference bridge being throttled may have a threshold value that reflects the slow accrual of active ports on the conference bridge and prevent too many active ports on the bridge at any one time. For example, a newly added conference bridge may begin with a threshold value of 50% for a particular amount of time to prevent the bridge from having more than half of the communication ports active upon starting. In another embodiment, the conference bridge being throttled may limit the number of consecutive new collaboration conference starts that occur on that particular bridge. Once the limit is reached, the throttled conference bridge is held from hosting new collaboration conferences for a set amount of time. Further, such throttling may be overridden in those circumstances where no other conference bridge is available. In other words, the throttling feature may be overridden to prevent a collaboration conference from not being connected.

As described in FIG. 3 above, once the conference bridge is selected, the CCRS routes the conference request to a conference bridge by requesting the conference bridge for an available port on the bridge. If the conference request is a request to establish a collaboration conference, the request may be for a plurality of available ports to host the conference. The allocation of available ports associated with the conference bridge for hosting the conference may be handled by a request from the CCRS or by a control server associated with the conference bridge. In either case, available ports of the conference bridge may be made available in response to the conference request.

As mentioned above, the CCRS system may include a plurality of control engines executing on several CCRS devices or application servers. As such, a master CCRS device or master control engine may be set to determine which control engine routes a collaboration conference request. In one embodiment, the master control engine may be determined by connection criteria. For example, each control engine of the CCRS devices may maintain a total number of bridges that are connected to all of the control engines with which the local control engine is communicating. In this embodiment, the control engine that sees the highest total number of bridges is selected as the master control engine and handles all collaboration conference requests. However, if more than one control engine sees the highest total number of bridge connections, the control engine with the highest number of local connections between the control engines with the highest total number is selected as the master control engine. If no single control engine is selected by the first two criteria, than a prioritized system ID may be employed to select the master control engine. It should be appreciated that this is but one example of a method for selecting the master control engine and any method to select a master control engine from the operating control engines may be employed. The use of a master control engine to determine which conference bridge a new collaboration conference is established may aid in preventing a split conference being established on multiple bridges. Additionally, any control engine of the CCRS may act as the master control engine based on any criteria, including the example mentioned above. Some delay may be incorporated into the switching the master control engine from one engine to another to prevent bouncing from one engine to another rapidly.

Another advantage that the priority list provides is in the situation when a conference bridge is placed offline or suffers a failure. For example, a scheduled maintenance on one of the conference bridges may be desired by a network administrator. Thus, conferences currently being hosted on the conference bridge for repair may be maintained by the CCRS, but new conferences may be directed to other conference bridges in an effort to remove the conferences from the selected conference bridge. To accomplish this, the CCRS may remove the selected conference bridge from the priority lists for each requester. Thus, when a request is received and the CCRS consults the priority list for the requester, the selected bridge is not an available option. However, the master control engine may continue to direct requests for ongoing conferences to the proper conference bridge. The operation of disaster recovery in relation to the CCRS is described in more detail in U.S. Non-Provisional patent application Ser. No. 13/708,689 titled "DISASTER RECOVERY WITH A CENTRAL CONFERENCING ROUTING SERVER," which is hereby incorporated by reference herein.

The CCRS may perform a similar operation when a conference bridge enters a failure state. In this situation, the failed bridge may be removed from the priority list for each requester. In addition, all requests received by the CCRS to join an existing conference may be sent to another conference bridge. However, this may create a situation where a conference is split between two conference bridges. In this situation, the CCRS may generate a notice to a network administrator of the potential for a split conference so that the administrator may direct each participant of the split conference to a single, operating conference bridge. In some embodiments, the recovery of a split conference into a united conference may be performed automatically by the CCRS upon detection. In addition, upon bringing the failed bridge back online, the CCRS may throttle the conferences placed on the bridge to prevent an overload of the bridge.

The CCRS includes other features that may aid the network in transmitting collaboration conferences. For example, one embodiment of the CCRS may route an internet or web connection that is associated with the collaboration conference to the same conference bridge that hosts the conference to maintain continuity between the related web application and the conference. Another example may include a conference lingering feature that maintains the status of each conference in the state engines for a specified amount of time to allow any changes or alterations to the requesters account to propagate to each conference bridge and state engine associated with the CCRS. Additionally, the CCRS may be configured to collect information about the conferences and store this information for analyze or use by the network and/or administrators of the network. For example, information on the number of participants associated with any conference may be maintained for future analysis to differentiate large conference users for future routing decisions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A system for selecting a conference bridge associated with a network for hosting a collaboration conference event, the system comprising:
   a network interface unit configured to receive communications from users of the network to establish collaboration conferences on the network;
   a processing device in communication with the network interface unit; and
   a memory connected to the processing device configured to store information and instructions that, when executed by the processing device, performs the operations of:
      maintaining a list of a plurality of conference bridges associated with the network;
      determining a new conference bridge associated with the network, wherein determining a new conference bridge associated with the network comprises:
         determining that the new conference bridge had been temporarily removed from the network;
      adding the new conference bridge to the list;
      receiving a request to initiate a new collaboration conference event associated with the new conference bridge; and
      determining whether to add the new collaboration conference event to the new conference bridge based on a throttling rule, wherein the throttling rule comprises limiting a number of active ports of the new conference bridge for a given time frame.

2. The system as recited in claim 1, wherein determining a new conference bridge associated with the network comprises:
   determining that the new conference bridge has rebooted after failing.

3. The system as recited in claim 1, wherein the throttling rule comprises:
   limiting a number of consecutive new collaboration conference events that can be initiated on the new conference bridge for a given time frame.

4. The system as recited in claim 1, further comprising:
   determining to not add the new collaboration conference event to the new conference bridge based on the throttling rule;
   determining that no other conference bridges in the list are available to host the new collaboration conference event; and
   overriding the throttling rule thereby adding the new collaboration conference event to the new conference bridge.

* * * * *